(12) United States Patent
Kim et al.

(10) Patent No.: US 12,278,420 B2
(45) Date of Patent: Apr. 15, 2025

(54) ELECTRONIC DEVICE INCLUDING MMWAVE ANTENNA MODULE

(71) Applicant: Samsung Electronics Co., Ltd., Gyeonggi-do (KR)

(72) Inventors: Younghoon Kim, Gyeonggi-do (KR); Juhyun Park, Gyeonggi-do (KR); Younggirl Yun, Gyeonggi-do (KR); Taewook Ham, Gyeonggi-do (KR); Haejin Lee, Gyeonggi-do (KR); Jooho Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 758 days.

(21) Appl. No.: 17/168,321

(22) Filed: Feb. 5, 2021

(65) Prior Publication Data
US 2021/0249760 A1 Aug. 12, 2021

(30) Foreign Application Priority Data
Feb. 7, 2020 (KR) .......................... 10-2020-0015267

(51) Int. Cl.
*H01Q 1/38* (2006.01)
*H01Q 1/02* (2006.01)
(Continued)

(52) U.S. Cl.
CPC ............... *H01Q 1/243* (2013.01); *H01Q 1/02* (2013.01); *H01Q 1/526* (2013.01); *H04B 1/0057* (2013.01)

(58) Field of Classification Search
CPC .......... H01Q 1/243; H01Q 1/02; H01Q 1/526; H01Q 1/38; H01Q 17/00; H04B 1/0057;
(Continued)

(56) References Cited

U.S. PATENT DOCUMENTS 5,740,527 A * 4/1998 Mitama ................ H04B 1/3827
361/818
6,304,458 B1 * 10/2001 Mendolia ............. H05K 9/0032
174/385

(Continued)

FOREIGN PATENT DOCUMENTS

KR 10-2019-0060180 A 6/2019
KR 10-2019-0061161 A 6/2019
(Continued)

OTHER PUBLICATIONS

International Search Report dated Jun. 3, 2021.
Korean Office Action dated Nov. 13, 2023.
Notice of Patent Grant dated Jul. 29, 2024.

*Primary Examiner* — Hai V Tran
*Assistant Examiner* — Bamidele A Immanuel
(74) *Attorney, Agent, or Firm* — Cha & Reiter, LLC (57) ABSTRACT

According to certain embodiments, an electronic device comprises: a window forming at least a portion of a front surface of the electronic device; a cover forming at least a portion of a rear surface of the electronic device; a bracket disposed between the window and the cover; a printed circuit board supported by the bracket and disposed between the window and the cover; a shield can disposed on the printed circuit board covering a designated area of the printed circuit board; at least one communication processor disposed on the printed circuit board; and a mmWave antenna module connected to the printed circuit board, and electrically connected with the at least one communication processor via the printed circuit board, wherein the mmWave antenna module is disposed on the shield can and configured to transfer heat to the shield can.

20 Claims, 7 Drawing Sheets

(51) Int. Cl.
*H01Q 1/24* (2006.01)
*H01Q 1/52* (2006.01)
*H04B 1/00* (2006.01)

(58) Field of Classification Search
CPC .. H04B 1/3833; H04M 1/0249; H04M 1/0277
See application file for complete search history.

(56) References Cited

U.S. PATENT DOCUMENTS

| | | | | |
|---|---|---|---|---|
| 6,946,996 | B2* | 9/2005 | Koyama | H01Q 9/42 343/702 |
| 10,653,046 | B2 | 5/2020 | Hong | |
| 10,699,985 | B2 | 6/2020 | Chung et al. | |
| 11,073,872 | B2* | 7/2021 | Leopold | H05K 9/0024 |
| 2003/0103014 | A1* | 6/2003 | Birnbaum | H01Q 9/0421 343/702 |
| 2004/0048515 | A1* | 3/2004 | Lai | H01Q 1/526 439/607.01 |
| 2004/0160369 | A1* | 8/2004 | Wong | H05K 9/002 343/702 |
| 2004/0178960 | A1* | 9/2004 | Sun | H01Q 1/243 343/700 MS |
| 2005/0052858 | A1* | 3/2005 | Shima | H04B 15/00 361/814 |
| 2006/0250312 | A1* | 11/2006 | Kobayashi | H01Q 1/243 343/702 |
| 2007/0103882 | A1* | 5/2007 | Liang | H05K 9/0028 361/816 |
| 2007/0153491 | A1* | 7/2007 | Lee | H01L 25/0657 257/E25.031 |
| 2007/0188384 | A1* | 8/2007 | Liu | H01Q 9/0421 343/700 MS |
| 2009/0283319 | A1* | 11/2009 | Hsieh | H05K 9/0045 361/818 |
| 2011/0255850 | A1* | 10/2011 | Dinh | B41F 17/00 396/176 |
| 2013/0016484 | A1* | 1/2013 | Yoo | H04B 1/3833 361/752 |
| 2014/0313680 | A1* | 10/2014 | Kil | H05K 9/0032 361/752 |
| 2014/0362543 | A1* | 12/2014 | Jang | H05K 9/0052 361/748 |
| 2015/0022986 | A1* | 1/2015 | Steuer | H05K 5/0017 361/767 |
| 2016/0044835 | A1* | 2/2016 | Lee | H05K 9/0032 29/841 |
| 2017/0150657 | A1* | 5/2017 | Seo | H05K 1/181 |
| 2017/0214146 | A1* | 7/2017 | Honkanen | H01Q 1/48 |
| 2018/0035528 | A1* | 2/2018 | Kim | H05K 9/0033 |
| 2019/0043779 | A1* | 2/2019 | Chung | H05K 7/20 |
| 2019/0103682 | A1* | 4/2019 | Thai | H01Q 9/28 |
| 2019/0104212 | A1* | 4/2019 | Lee | H01Q 9/0435 |
| 2019/0387649 | A1* | 12/2019 | Hong | H01Q 1/243 |
| 2020/0396871 | A1* | 12/2020 | Yun | H01Q 1/243 |

FOREIGN PATENT DOCUMENTS

| | | |
|---|---|---|
| KR | 10-1998343 B1 | 7/2019 |
| KR | 10-2019-0142862 A | 12/2019 |

* cited by examiner

FIG.6

ELECTRONIC DEVICE INCLUDING MMWAVE ANTENNA MODULE

CROSS-REFERENCE TO RELATED APPLICATION(S)

This application is based on and claims priority under 35 U.S.C. § 119 to Korean Patent Application No. 10-2020-0015267, filed on Feb. 7, 2020, in the Korean Intellectual Property Office, the disclosure of which is herein incorporated by reference in its entirety.

BACKGROUND

Field

Certain embodiments relate to an electronic device including an antenna module.

Description of Related Art

Large amounts of data can be transmitted using a mmWave antenna module. The mmWave antenna module may include a plurality of active elements used in a high frequency front end (RF front-end).

The above information is presented as background information only to assist with an understanding of the disclosure. No determination has been made, and no assertion is made, as to whether any of the above might be applicable as prior art with regard to the disclosure.

SUMMARY

According to certain embodiments, an electronic device comprises: a window forming at least a portion of a front surface of the electronic device; a cover forming at least a portion of a rear surface of the electronic device; a bracket disposed between the window and the cover; a printed circuit board supported by the bracket and disposed between the window and the cover; a shield can disposed on the printed circuit board covering a designated area of the printed circuit board; at least one communication processor disposed on the printed circuit board; and a mmWave antenna module connected to the printed circuit board, and electrically connected with the at least one communication processor via the printed circuit board, wherein the mmWave antenna module is disposed on the shield can and configured to transfer heat to the shield can.

According to certain embodiments, an electronic device comprises: a front surface plate which is substantially transparent; a rear surface plate which faces the front surface plate; a printed circuit board which is disposed between the front surface plate and the rear surface plate; a plurality of electronic circuit elements disposed on the printed circuit board; a shield can be disposed on the printed circuit board; solder attaching the shield to the printed circuit board and covering the plurality of electronic circuit elements; and a mmWave antenna module disposed on the shield can, wherein the mmWave module comprises: a substrate part formed with a plurality of layers; a shielding part configured to cover a portion of the substrate part, wherein the shielding part contacts the shield can.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

A mmWave antenna module can generate a large amounts of heat. The heat may influence not only performance of the mmWave antenna module but also performance of other electronic components mounted on the periphery thereof. As a result, the heat generated by the mmWave antenna can degrade the performance of the electronic device.

When the mmWave antenna module is disposed on an outermost portion of an electronic device to enhance sensitivity and increase antenna efficiency, heat generated from the mmWave antenna module may cause low temperature burns to users.

A metal block may be used to To alleviate heat emission from the mmWave antenna module. The heat generated from the mmWave antenna module may be transmitted to a metal block attached to the mmWave antenna module. However, since the metal block has a relatively larger weight than other components of the electronic device, a means for attaching the metal block to a printed circuit board may become a problem. If the metal block is attached by soldering, the metal block may be easily detached by external impacts. If the metal block is attached to the printed circuit board through an adhesive member such as an adhesive tape, heat dissipation efficiency may be reduced. In addition, a mounting area of an electronic circuit element on the printed circuit board may be reduced due to the metal block.

Figure 1:
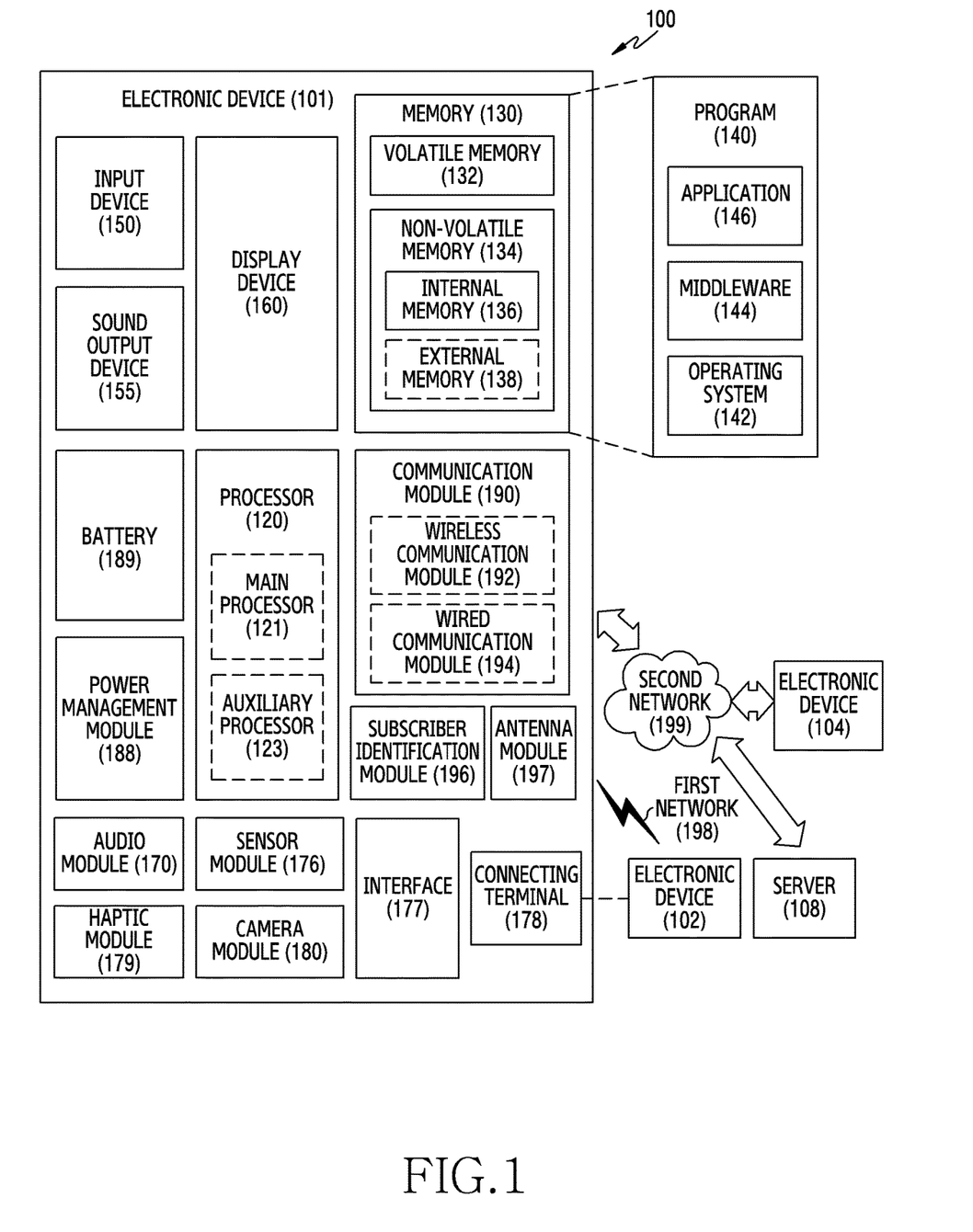
FIG. 1 is a block diagram of an electronic device in a network environment according to an embodiment.

FIG. 1 is a block diagram illustrating an electronic device 101 in a network environment 100 according to certain embodiments. The electronic device 101 can use a mmWave antenna module for high speed communications with other electronic devices 102, 104 over communication networks 198, 199.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The term "processor" shall be understood to refer to both the singular and plural contexts.

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

The antenna module 197 may include a mmWave antenna module to engage in high speed communications. A mmWave antenna module (or mmWave module) can generate large amounts of heat which can degrade the mmWave antenna module, and other electrical components. Where the mmWave antenna module is placed close the a wall of the housing, the heat can also cause low temperature burns to the user. As will be described below, certain embodiments described may alleviate the foregoing.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
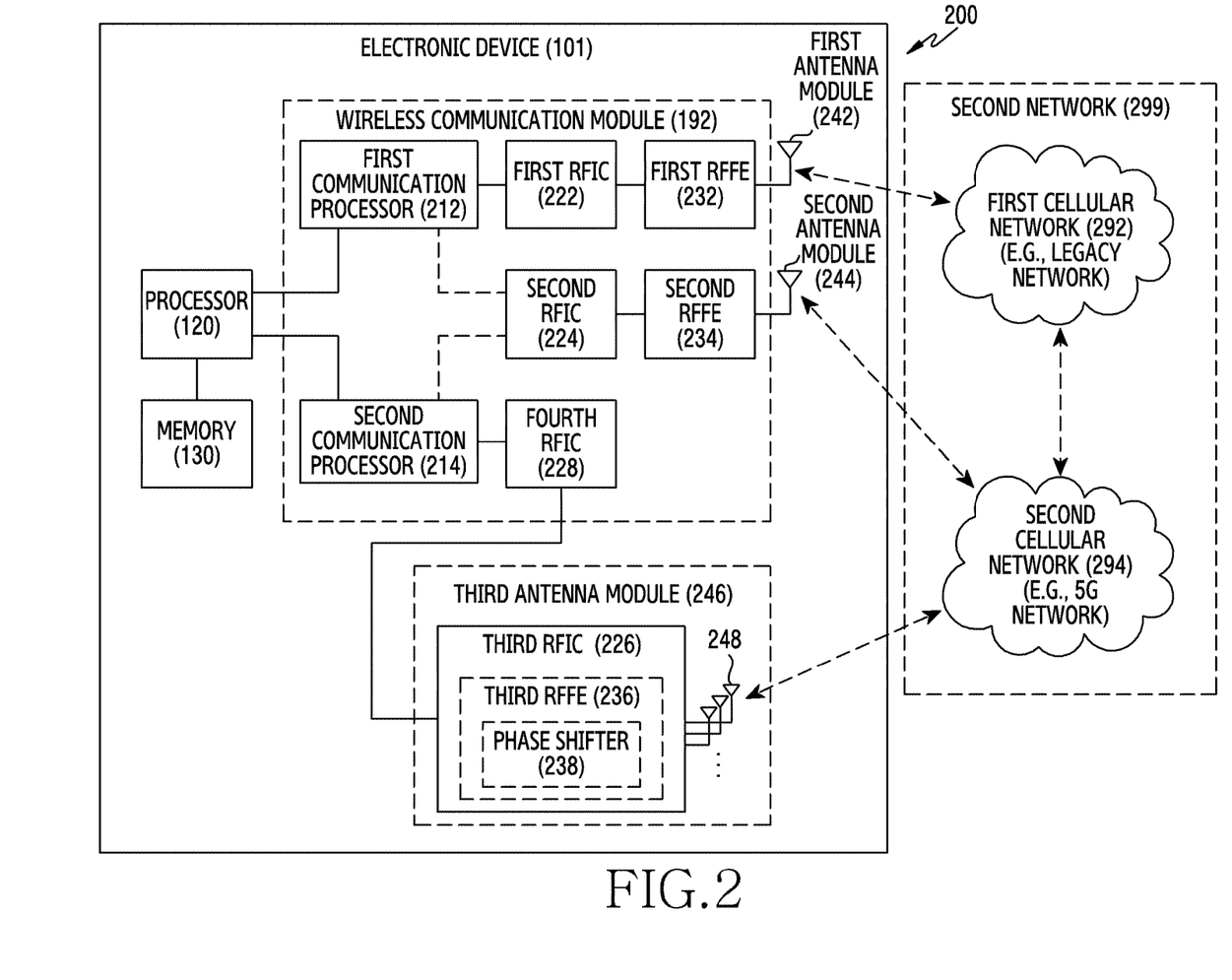
FIG. 2 is a block diagram of an electronic device in a network environment including a plurality of cellular networks according to an embodiment.

FIG. 2 is a block diagram 200 of an electronic device 101 for supporting legacy network communication and 5G network communication according to certain embodiments. The electronic device 101 can communicate using a first cellular network 292 that can include a legacy network as well as a second cellular network 294. In certain embodiments, the second network 294 may use millimeter wavelength communication. Accordingly, the electronic device 101 may use a mmWave antenna module 244.

As noted above, a mmWave antenna module can generate large amounts of heat which can degrade the mmWave antenna module, and other electrical components. Where the mmWave antenna module is placed close the a wall of the housing, the heat can also cause low temperature burns to the user. As will be described below, certain embodiments described may alleviate the foregoing.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A network 299 may include a first network 292 and a second network 294. According to another embodiment, the electronic device 101 may further include at least one component of the components described in FIG. 1, and the network 200 may further include at least one other network. According to an embodiment, the first communication processor 212, the second communication processor 214, the first RFIC 222, the second RFIC 224, the fourth RFIC 228, the first RFFE 232, and the second RFEE 234 may form at least a portion of a wireless communication module 192. According to another embodiment, the fourth RFIC 228 may be omitted or may be included as a portion of the third RFIC 226.

The first communication processor 212 may establish a communication channel of a band to be used for wireless communication with the first network 292, and may support legacy network communication through the established communication channel. According to certain embodiments, the first network may be a legacy network that includes a second generation (2G), 3G, 4G, or long term evolution (LTE) network.

The second communication processor 214 may establish a communication channel corresponding to a designated band (for example, about 6 GHz to about 60 GHz) from among bands to be used for wireless communication with the second network 294, and may support 5G network communication through the established communication channel. According to certain embodiments, the second network 294 may be a 5G network that is defined by $3^{rd}$ generation partnership project (3GPP). Additionally, according to an embodiment, the first communication processor 212 or the second communication processor 214 may establish a communication channel corresponding to another designated band (for example, about 6 GHz or less) from among the bands to be used for wireless communication with the second network 294, and may support 5G network communication through the established communication channel. According to an embodiment, the first communication processor 212 and the second communication processor 214 may be implemented within a single chip or a single package. According to certain embodiments, the first communication processor 212 or the second communication processor 214 may be formed within a single chip or a single package along with the processor 120, an auxiliary processor 123, or the communication module 190.

When transmitting signals, the first RFIC 222 may convert a baseband signal generated by the first communication processor 212 into a radio frequency (RF) signal of about 700 MHz to about 3 GHz to be used in the first network 292 (for example, a legacy network). When an RF signal is received, the RF signal may be acquired from the first network 292 (for example, a legacy network) through an antenna (for example, the first antenna module 242), and may be pre-processed through an RFFE (for example, the first RFFE 232). The first RFIC 222 may convert the pre-processed RF signal into a baseband signal to be processed by the first communication processor 212.

When transmitting signals, the second RFIC 224 may convert a baseband signal generated by the first communication processor 212 or the second communication processor 214 into an RF signal (hereinafter, a 5G Sub6 RF signal) of a Sub6 band (for example, about 6 GHz or less) to be used in the second network 294 (for example, a 5G network). When a 5G Sub6 RF signal is received, the 5G Sub6 RF signal may be acquired from the second network 294 (for example, a 5G network) through an antenna (for example, the second antenna module 244), and may be pre-processed through an RFFE (for example, the second RFFE 234). The second RFIC 224 may convert the pre-pressed 5G Sub6 RF signal into a baseband signal to be processed by a corresponding communication processor of the first communication processor 212 or the second communication processor 214.

The third RFIC 226 may convert a baseband signal generated by the second communication processor 214 into an RF signal (hereinafter, a 5G Above6 RF signal) of a 5G Above6 band (for example, about 6 GHz to about 60 GHz) to be used in the second network 294 (for example, a 5G network). When a 5G Above6 RF signal is received, the 5G Above6 RF signal may be acquired from the second network 294 (for example, a 5G network) through an antenna (for example, the antenna 248), and may be pre-processed through a third RFFE 236. The third RFIC 226 may convert the pre-processed 5G Above6 RF signal into a baseband signal to be processed by the second communication processor 214. According to an embodiment, the third RFFE 236 may be formed as a portion of the third RFIC 226.

In certain embodiments, the electronic device 101 uses a mmWave antenna module to transmit and receive signals in the Above6 band.

According to an embodiment, the electronic device 101 may include the fourth RFIC 228 independently from the third RFIC 226 or as at least a portion thereof. In this case, the fourth RFIC 228 may convert a baseband signal generated by the second communication processor 214 into an RF signal of an intermediate frequency band (for example, about 9 GHz to about 11 GHz) (hereinafter, an IF signal), and then may transmit the IF signal to the third RFIC 226. The third RFIC 226 may convert the IF signal into a 5G Above6 RF signal. When a 5G Above6 RF signal is received, the 5G Above6 RF signal may be received from the second network 294 (for example, a 5G network) through an antenna (for example, the antenna 248), and may be converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least a portion of a single chip or a single package. According to an embodiment, the first RFFE 232 and the second RFFE 234 may be implemented as at least a portion of a single chip or a single package. According to an embodiment, at least one antenna module of the first antenna module 242 or the second antenna module 244 may be omitted or may be coupled with another antenna module to process RF signals of a plurality of corresponding bands.

According to an embodiment, the third RFIC 226 and the antenna 248 may be disposed on the same substrate to form a third antenna module 246. For example, the wireless communication module 192 or the processor 120 may be disposed on a first substrate (for example, a main PCB). In this case, the third RFIC 226 may be disposed on some area (for example, a lower surface) of a second substrate (for example, a sub PCB) which is separate from the first substrate, and the antenna 248 may be disposed on some other area (for example, an upper surface), such that the third antenna module 246 is formed. The third RFIC 226 and the antenna 248 may be disposed on the same substrate, so that a length of a transmission line therebetween can be reduced. For example, this can prevent a signal of a high frequency band (for example, about 6 GHz to about 60 GHz) used in 5G network communication from being lost (for example, from attenuating) by the transmission line. Accordingly, the electronic device 101 can enhance quality or speed of communication with the second network 294 (for example, a 5G network).

According to an embodiment, the antenna 248 may be formed with an antenna array including a plurality of antenna elements which may be used for beamforming. In this case, the third RFIC 226 may include, as a portion of the third RFFE 236, a plurality of phase shifters 238 corresponding to the plurality of antenna elements. When transmitting signals, each of the plurality of phase shifters 238 may convert a phase of a 5G Above6 RF signal to be transmitted to the outside (for example, a base station of a 5G network) of the electronic device 101 through a corresponding antenna element. When receiving signals, each of the plurality of phase shifters 238 may convert a phase of a 5G Above6 RF signal received from the outside through a corresponding antenna element into the same or substantially the same phase. This may make it possible to transmit or receive signals through beamforming between the electronic device 101 and the outside.

The second network 294 (for example, a 5G network) may operate independently from the first network 292 (for example, a legacy network) (for example, stand-alone (SA)), or may operate in connection therewith (for example, non-stand alone (NSA)). For example, the 5G network may include only an access network (for example, a 5G radio access network (RAN) or a next generation RAN (NG RAN)), and may not include a core network (for example, a next generation core (NGC)). In this case, the electronic device 101 may access the access network of the 5G network, and then, may access an external network (for example, Internet) under control of the core network (for example, an evolved packed core (EPC)) of the legacy network. Protocol information (for example, LTE protocol information) for communication with the legacy network or protocol information (for example, new radio (NR) protocol information) for communication with the 5G network may be stored in a memory 230, and may be accessed by other components (for example, the processor 120, the first communication processor 212, or the second communication processor 214).

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3A:
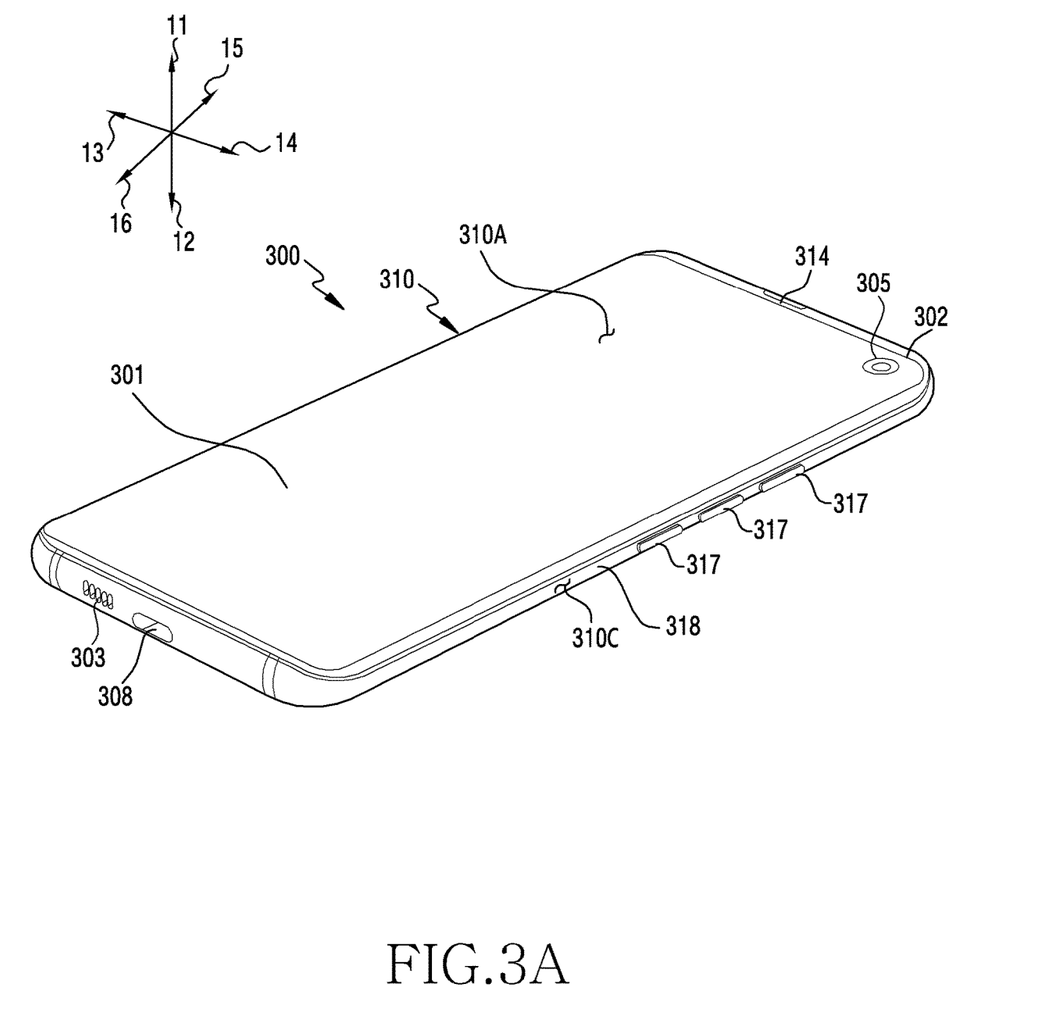
FIG. 3A is a perspective view illustrating an electronic device according to an embodiment.

FIG. 3A is a perspective view illustrating an electronic device 300 according to an embodiment.

Figure 3B:
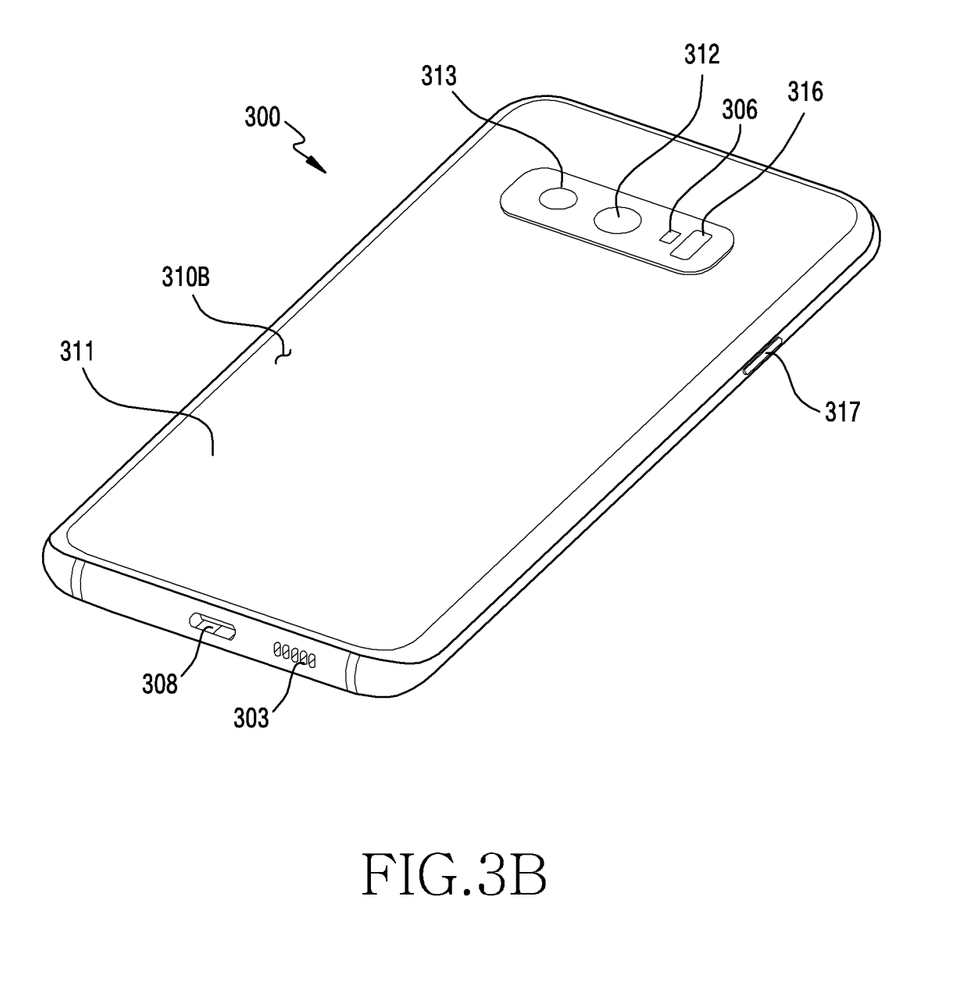
FIG. 3B is a perspective view illustrating the electronic device of FIG. 3A according to an embodiment when viewed from the back.

FIG. 3B is a perspective view illustrating the electronic device 300 of FIG. 3A when viewed from the back.

In certain embodiments, the electronic device 300 includes a window forming at least a portion of a front surface, such as the first surface 310A, of the electronic device 300 and a cover forming at least a portion of a rear surface, such as the second surface 310B of the electronic device 300. A bracket forming a portion of sidewall 310C can be disposed between the window and the cover. The window, bracket, and cover can form that housing of the electronic device 300, and electronic components can be disposed inside the housing.

Referring to FIGS. 3A and 3B, the electronic device 300 (for example, the electronic device 101) according to an embodiment may include a housing 310 including a first surface (or a front surface) 310A, a second surface (or a rear surface) 310B, and a side surface (or a sidewall) 310C enclosing a space between the first surface 310A and the second surface 310B. In another embodiment (not shown), the housing may refer to a structure forming a portion of the first surface 310A, the second surface 310B, and the side surface 310C of FIGS. 3A and 3B.

According to an embodiment, the first surface 310A may be formed by a front surface plate 302 (for example, a glass plate including various coating layers, or a polymer plate) having at least a portion substantially transparent. According to an embodiment, the front surface plate 302 may include a curved portion that is bent from the first surface 310A toward a rear surface plate 311 on at least a side edge portion and is seamlessly extended. In certain embodiments, the front surface plate 302 can include a window.

According to an embodiment, the second surface 310B may be formed by the substantially opaque rear surface plate 311. The rear surface plate 311 may be formed by, for example, coated or colored glass, ceramic, a polymer, metal (for example, aluminum, stainless steel (STS), or magnesium), or a combination of at least two of the above-mentioned materials. According to an embodiment, the rear surface plate 311 may include a curved portion that is bent from the second surface 310B toward the front surface plate 302 on at least a side edge portion and is seamlessly extended. In certain embodiments, the rear surface plate 311 can include a cover.

According to an embodiment, the side surface 310C may be coupled with the front surface place 302 and the rear surface plate 311, and may be formed by a side surface bezel structure (or a "side surface member or sidewall") 318 including metal and/or a polymer. In a certain embodiment, the rear surface plate 311 and the side surface bezel structure 318 may be integrally formed with each other, and may include the same material (for example, a metallic material such as aluminum). In certain embodiments, the side surface bezel structure 318 can include a bracket.

According to an embodiment, the electronic device 300 may include at least one of a display 301, an audio module 303, 314, a sensor module, a camera module 305, a key input device 317, and a connector hole 308. According to a certain embodiment, the electronic device 300 may omit at least one (for example, the key input device 317) of the components or may additionally include other components. For example, the electronic device 300 may include the sensor module which is not illustrated. For example, a sensor such as a proximity sensor or an illuminance sensor may be integrated into the display 301 within an area provided by the front surface plate 302, or may be disposed on a position adjacent to the display 301. In a certain embodiment, the electronic device 300 may further include a light emitting element, and the light emitting element may be disposed on a position adjacent to the display 301 within an area provided by the front surface plate 302. The light emitting element may provide state information of the electronic device 300 in the form of light. In another embodiment, the light emitting element may provide a light source which operates in association with the operation of the camera module 305. The light emitting element may include, for example, a light emitting diode (LED), an infrared LED (IR LED), and a xenon lamp.

The display 301 may be exposed through a substantial portion of the front surface plate 302. In a certain embodiment, an edge of the display 301 may be formed substantially the same as a border shape (for example, a curved surface) of the front surface plate 202 that is adjacent to the display. In another embodiment (not shown), a gap between the border of the display 301 and the border of the front surface plate 302 may be formed substantially the same to extend an exposed area of the display 301. In another embodiment (not shown), a recess or an opening may be formed on a portion of a screen display area of the display 301, and the electronic device 300 may include other electronic components aligned with the recess or the opening, for example, the camera module 305, a proximity sensor (not shown) or an illuminance sensor (not shown).

In another embodiment (not shown), at least one of a camera module 312, 313, a fingerprint sensor 316, and a flash 306 may be included on a back surface of the screen display area of the display 301. In another embodiment (not shown), the display 301 may be coupled with or disposed adjacent to a touch detection circuitry, a pressure sensor for measuring an intensity (pressure) of a touch, and/or a digitizer for detecting a stylus pen of a magnetic field method.

The audio module 303, 314 may include a microphone hole and a speaker hole. The microphone hole may have a microphone disposed therein to acquire an external sound, and in a certain embodiment, the microphone hole may have a plurality of microphones disposed therein to detect a direction of a sound. In a certain embodiment, the speaker hole and the microphone hole may be implemented as one hole 303, or a speaker (for example, a piezo speaker) may be included without a speaker hole. The speaker hole may include an external speaker hole or a receiver hole 314 for communication.

The electronic device 300 may include the sensor module which is not illustrated, thereby generating an electric signal or a data value corresponding to an internal operation state or an external environment state. The sensor module may further include a proximity sensor disposed on the first surface 310A of the housing 310, a fingerprint sensor integrated into or disposed adjacent to the display 301, and/or a biometric sensor (for example, a heart rate monitor (HRM) sensor) disposed on the second surface 310B of the housing 310. The electronic device 300 may further include a sensor module (not shown), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera module 305, 312, 313, 306 may include a first camera device 305 disposed on the first surface 310A of the electronic device 300, a second camera device 312, 313 disposed on the second surface 310B, and/or the flash 306. The camera devices 305, 312, 313 may include one lens or a plurality of lenses, an image sensor, and/or an image signal processor. The flash 306 may include, for example, a light emitting diode or a xenon lamp. In a certain embodiment, two or more lenses (an infrared camera, a wide angle lens and a telephoto lens) and image sensors may be disposed on one surface of the electronic device 300.

The key input device 317 may be disposed on the side surface 310C of the housing 310. In another embodiment, the electronic device 300 may not include a portion or an entirety of the above-mentioned key input device 317, and the key input device 317 that is not included may be implemented on the display 301 in other forms such as a soft key. In a certain embodiment, the key input device may include at least a portion of the fingerprint sensor 316 disposed on the second surface 310B of the housing 310.

The connector hole 308 may accommodate a connector for transmitting and receiving power and/or data to and from an external electronic device, and/or a connector for transmitting and receiving an audio signal to and from an external electronic device. For example, the connector hole 308 may include a USB connector or an earphone jack.

As noted above, the electronic device 300 can communicate using millimeter wavelength signals using a mmWave antenna module. The mmWave module can generate a large amount of heat. In certain embodiments, the mmWave module may be placed in close proximity to the side surface bezel structure 318. However, in certain embodiments, as will be described below, the heat generated by the mmWave antenna module is prevented from raising the temperature of side surface bezel structure 318.

Figure 4:
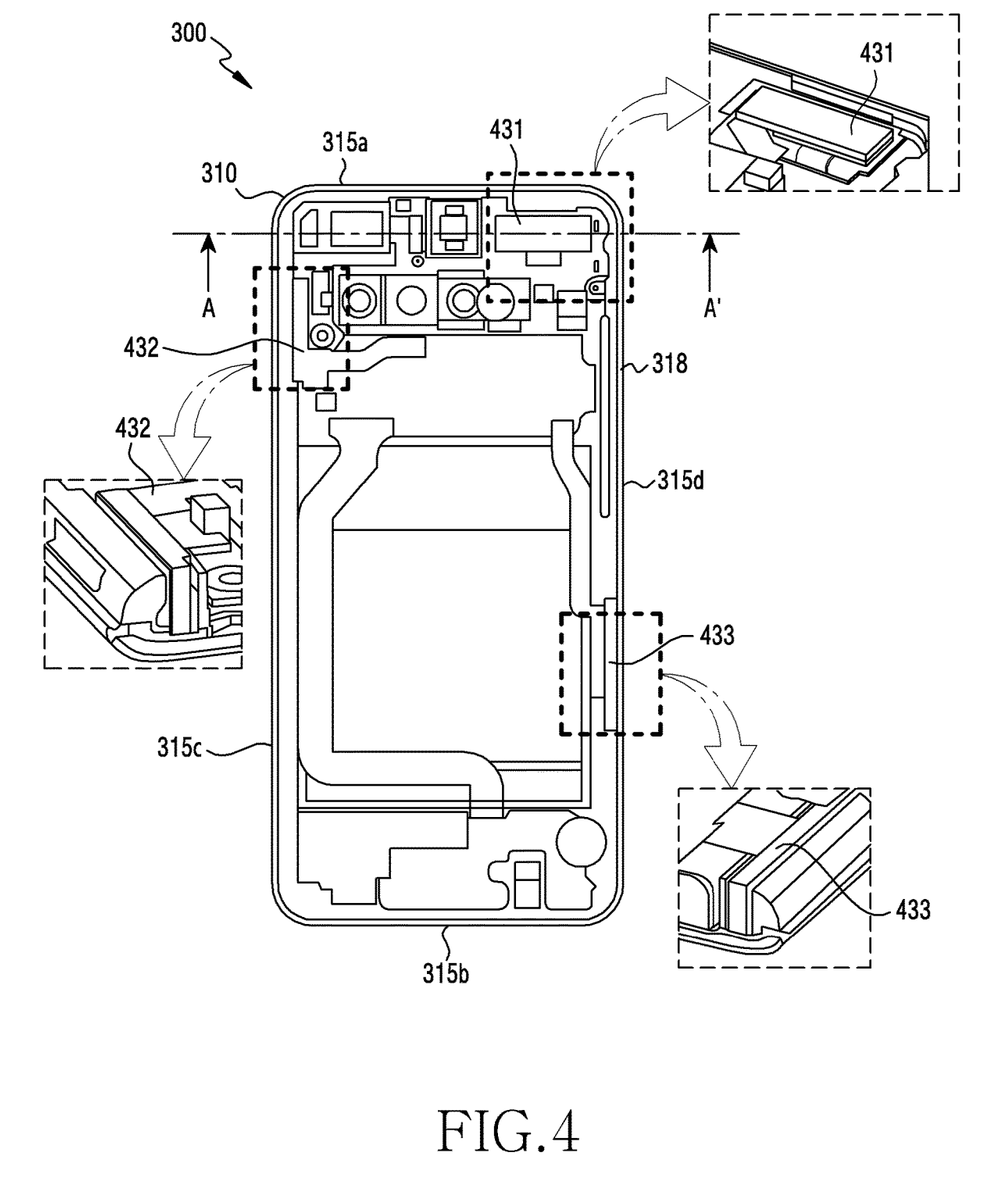
FIG. 4 is a view illustrating arrangements of antenna modules in an electronic device according to an embodiment.

FIG. 4 illustrates arrangements of antenna modules in an electronic device according to certain embodiments.

Referring to FIG. 4, the electronic device 300 may include a first antenna module 431, a second antenna module 432, and a third antenna module 433. The first antenna module 431, the second antenna module 432, and the third antenna module 433 may correspond to the third antenna module 246 of FIG. 2.

In an embodiment, the first antenna module 431, the second antenna module 432, and the third antenna module 433 may be disposed in an inner space of a housing 310 or a side surface bezel structure 318. In an embodiment, each of the first antenna module 431, the second antenna module 432, and the third antenna module 433 may include an array antenna radiator.

According to an embodiment, the side surface bezel structure 318 may include a first periphery 315a, a second periphery 315b, a third periphery 315c, and a fourth periphery 315d. The first periphery 315a of the side surface bezel structure 318 may form a portion of a side surface (for example, the side surface 310C of FIGS. 3A and 3B) of the housing 310. For example, the first periphery 315a may be a periphery that is extended along an upper portion of the housing 310. The second periphery 315b may face the first periphery 315a and may be extended substantially (or within 3 degrees) in parallel with the first periphery 315a to form a portion of the side surface of the housing 310 (for example, a lower portion of the housing 310). The third periphery 315c may be extended from one end of the first periphery 315a to one end of the second periphery 315b, and may be formed to be substantially (or within 3 degrees) perpendicular to the first periphery 315a and the second periphery 315b. The fourth periphery 315d may be extended from the other end of the first periphery 315a to the other end of the second periphery 315b in parallel with the third periphery 315c. The first periphery 315a and the second periphery 315b may be formed shorter than the third periphery 315c and the fourth periphery 315d.

According to an embodiment, the first antenna module 431 may be disposed on a short periphery of the side surface bezel structure 318. For example, the first antenna module 431 may be disposed on the first periphery 315a of the side surface bezel structure 318. The first antenna module 431 may be disposed in the proximity of a vertex formed by the first periphery 315a and the fourth periphery 315d. In another embodiment, unlike that illustrated in the drawing, the first antenna module 431 may be disposed in the proximity of a vertex formed by the first periphery 315a and the third periphery 315c of the side surface bezel structure 318. In another embodiment, unlike that illustrated in the drawing, the first antenna module 431 may be disposed on the second periphery 315b of the side surface bezel structure 318.

In an embodiment, the first antenna module 431 may be disposed to have an array antenna radiator of the first antenna module 431 face a rear surface plate 311 (or the rear surface 310B of the housing 310).

According to an embodiment, the second antenna module 432 and the third antenna module 433 may be disposed to face the side surface bezel structure 318. For example, the second antenna module 432 and the third antenna module 433 may be disposed to have array antenna radiators included in the second antenna module 432 and the third antenna module 433, respectively, face the side surface 310C of the housing 310.

According to an embodiment, the second antenna module 432 and the third antenna module 433 may be disposed in a long periphery of the side surface bezel structure 318. For example, the second antenna module 432 may be disposed on the third periphery 315c of the side surface bezel structure 318, and the third antenna module 433 may be disposed on the fourth periphery 315d of the side surface bezel structure 318.

According to an embodiment, the second antenna module 432 and the third antenna module 433 may be disposed to be misaligned from each other. For example, the second antenna module 432 may be disposed on the third periphery 315c to lean to (or closer to) the first periphery 315a, and the third antenna module 433 may be disposed on the fourth periphery 315d to lean to (closer to) the second periphery 315b.

Figure 5:
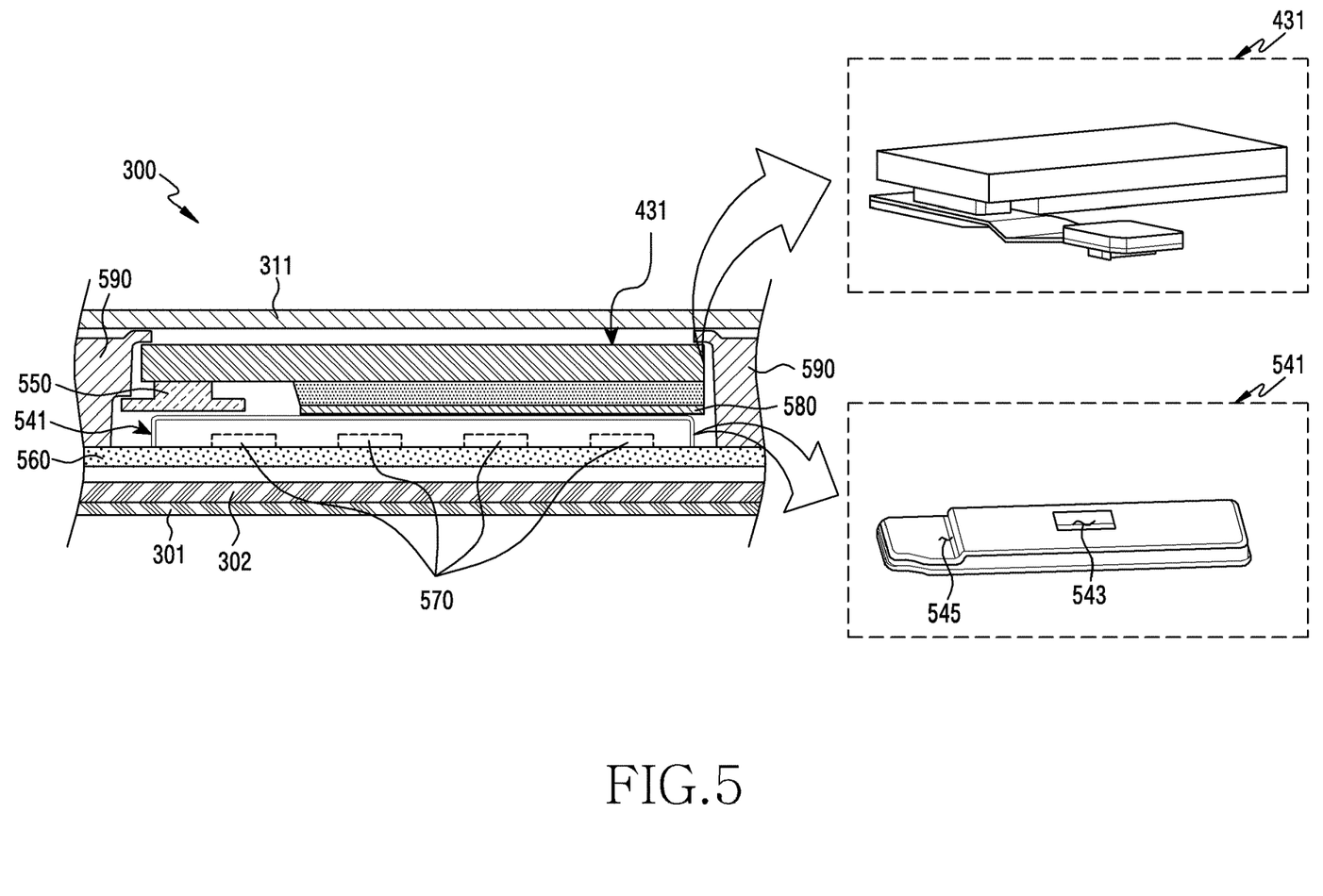
FIG. 5 is a view illustrating the electronic device taken on line A-A' of FIG. 4.

FIG. 5 is a view of the electronic device 300 taken on line A-A' of FIG. 4. Regarding components of FIG. 5 having the same reference numerals as the components shown in FIGS. 1 to 4, the same descriptions as in FIGS. 1 to 4 may be applied.

Referring to FIG. 5, the electronic device 300 according to an embodiment may include a printed circuit board 560, a shield can 541, a support member 590, and an adhesive member 580.

In an embodiment, the printed circuit board 560 may be disposed between the display 301 and the rear surface plate 311.

In an embodiment, the shield can 541 may be disposed on the printed circuit board 560. For example, the shield can 541 may be disposed on a surface of the printed circuit board 560 that faces the rear surface plate 311. In an embodiment, the shield can 541 may be attached to the printed circuit board 560 by soldering, and surface mount technology (SMT) may be used to attach the shield can 541 to the printed circuit board 560. When the shielding can 541 is attached by soldering, performance of heat transmission from the first antenna module 431 to the printed circuit board 560 can be enhanced. In addition, when the shield can 541 is attached to the printed circuit board 560 by soldering, electrical conductivity and resistance can be uniformly maintained.

Since a conductive pad of the printed circuit board 560 to which the shield can 541 is attached can function as a ground in an embodiment, the shield can 541 can enhance electromagnetic wave shielding performance of the first antenna module 431.

In an embodiment, the shield can 541 may be fixedly coupled with a shield can fixing member (for example, a shield can clip) mounted on the printed circuit board 560.

In an embodiment, the shield can 541 may provide a path to transmit heat generated in the first antenna module 431 to the printed circuit board 560. For example, the heat generated in the first antenna module 431 may be transmitted to the shield can 541 being in contact with the first antenna module 431, and the heat transmitted to the shield can 541 may be transmitted to the printed circuit board 560.

The electronic device 300 according to an embodiment may include a conductive adhesive tape to attach the shield can 541 to the printed circuit board 560.

In an embodiment, the shield can 541 may cover a designated area of the printed circuit board 560 and at least one electronic component 570 (for example, an electronic circuit element) may be disposed in the designated area of the printed circuit board 560 enclosed by the shield can 541. The shield can 541 may provide an electromagnetic wave shielding function to the at least one electronic component 570.

The at least one electronic component 570 may include, for example, at least one of a front end module (FEM), a power amplifier (PA) and/or a diplexer included in a wireless communication module (for example, the wireless communication module 192 of FIG. 2), but is not limited thereto. In an embodiment, the at least one electronic component 570 may include an electronic component. To prevent the performance of the electronic component from being degraded by the shield can 541, the shield can 541 may include an opening 543 corresponding to the area of the printed circuit board 560 where the electronic component is disposed. The opening 543 may overlap the electronic component and the performance of the electronic component may not be degraded although the electronic component is disposed in the shield can 541.

In an embodiment, the shield can 541 may include a step portion 545. For example, an upper surface of the shield can 541 may include a first area to which the first antenna module 431 is attached and a second area extended from the first area, and the second area may be formed to have a step from the first area. The step portion 545 of the shield can 541 may provide a space in which a connector 550 of the first antenna module 431, which is attached to the shield can 541, is connected to the printed circuit board 560 without interference by the shield can 541. In an embodiment, a height of the step portion 545 may vary according to a size of the connector 550 of the first antenna module 431. For example, as the size of the connector 550 increases, the height of the step portion 545 may also increase. In another example, as the size of the connector 550 decreases, the height of the step portion 545 may decrease or the step portion 545 of the shield can 541 may not be formed.

The support member 590 (for example, a bracket) may be disposed between the display 301 and the rear surface plate 311. The support member 590 may support the first antenna module 431 and the printed circuit board 560.

The first antenna module 431 may be disposed on the shield can 541. For example, the first antenna module 431 may be disposed on the shield can 541 with a shielding member (for example, a shielding member 620 of FIG. 6) included in the first antenna module 431 being in contact with the shield can 541. The first antenna module 431 may be attached to the shield can 541 by the adhesive member 580. In an embodiment, the adhesive member 580 may include a conductive double-sided tape.

Heat may be generated in the first antenna module 431 during transmission and receipt of radio signals, and the heat generated in the first antenna module 431 may be transferred to the printed circuit board 560 through the adhesive member 580 and the shield can 541.

The shield can 541 may include metal, for example, copper. For example, the shield can 541 may include various copper alloys having standards such as C7521 (KS), C5210 (KS), and C19400 (CDA&UNS), but is not limited by the above-described examples.

Transfer of the heat generated in the first antenna module 431 may vary according to a material and a thickness of the shield can 541. Temperatures of a front surface (for example, 310A of FIG. 3A), a rear surface (for example, 310B of FIG. 3B), and a side surface (for example, 310C of FIG. 3A) of the electronic device 300, application processor, communication processor, power management integrated circuit (PMIC) (for example, 654 of FIG. 6) and a radio frequency integrated circuit (RFIC) (for example, 652 of FIG. 6) in the first antenna module 431, which change according to a material and a thickness of the shield can 541, are shown in table 1 presented below:

TABLE 1

|  | Baseline | S/C 0.25 T C7521 + comp | S/C 0.25 T C5210 | S/C 0.2 T C19400 | S/C 0.25 T C19400 | Cu block |
|---|---|---|---|---|---|---|
| front surface | 48.9 | 49.0 | 49.0 | 49.0 | 49.0 | 49.0 |
| rear surface | 56.7 | 54.7 | 54.0 | 53.4 | 53.2 | 52.6 |
| side surface | 49.4 | 49.5 | 49.5 | 49.5 | 49.5 | 49.5 |
| AP | 61.3 | 61.3 | 61.4 | 61.4 | 61.4 | 61.4 |
| CP | 56.3 | 56.4 | 56.4 | 56.4 | 56.4 | 56.4 |
| PMIC | 81.0 | 74.3 | 71.9 | 70.0 | 69.7 | 67.7 |
| RFIC | 89.6 | 81.5 | 78.1 | 75.0 | 74.5 | 71.9 |

In an embodiment, the first antenna module 431 may be spaced apart from the rear surface plate 311. Since a space between the first antenna module 431 and the rear surface plate 311 may function as a dielectric, a distance by which the first antenna module 431 and the rear surface plate 311 are spaced apart from each other may vary according to required performance of the first antenna module 431. In an embodiment, the distance between the first antenna module 431 and the rear surface plate 311 may be adjusted according to a height (or thickness) of the support member 590 and/or the shield can 541. The height (or thickness) of the support member 590 and/or the shield can 541 may be changed to adjust the distance according to the required performance of the first antenna module 431.

In an embodiment, the first antenna module 431 may be connected to the printed circuit board 560 through the connector 550. The first antenna module 431 may be operatively connected with a communication processor (for example, the second communication processor 214 of FIG. 2) and a processor (for example, the processor 120 of FIG. 2) through an electric path which is provided through the connector 550 and the printed circuit board 560.

Figure 6:
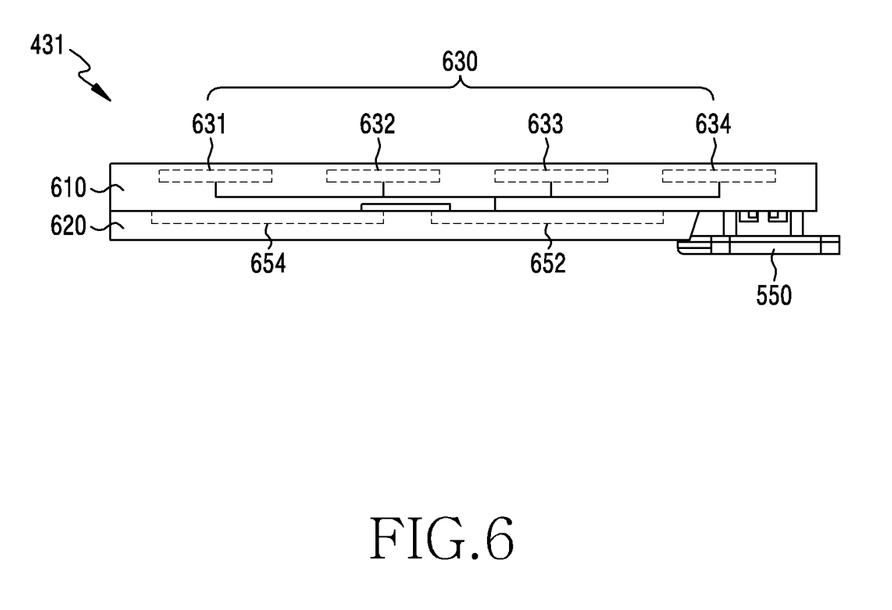
FIG. 6 is a view illustrating a first antenna module according to an embodiment.

FIG. 6 illustrates the first antenna module 431 according to an embodiment.

Descriptions provided with reference to FIG. 6 may be applied to the second antenna module 432 and the third antenna module 433, in addition to the first antenna module 431, in the same way or in a corresponding way.

Referring to FIG. 6, the first antenna module 431 in an embodiment may include a printed circuit board 610, an antenna array 630, an RFIC 652, a PMIC 654, a connector 550, and a shielding member 620. In another embodiment, at least one of the above-mentioned components may be omitted or at least two of the components may be integrally formed with each other.

The printed circuit board 610 may include a plurality of conductive layers and a plurality of nonconductive layers which are stacked alternately with the conductive layers. The printed circuit board 610 may provide an electrical connection between the printed circuit board 610 and/or various electronic components disposed on the outside by using lines and conductive vias formed on the conductive layers.

The antenna array 630 (for example, the antenna 248 of FIG. 2) may include a plurality of antenna elements 631, 632, 633, 634 disposed thereon to form a directional beam. The antenna elements may be formed on a first surface of the printed circuit board 610 as shown in FIG. 6. According to another embodiment, the antenna array 630 may be disposed within the printed circuit board 610. According to an embodiment, the antenna array 630 may include a plurality of antenna arrays of the same or different shapes or the same or different types (for example, a dipole antenna array and/or a patch antenna array).

The RFIC 652 (for example, the third RFIC 226 of FIG. 2) may be disposed on the other area (for example, a second surface opposite to the first surface) of the printed circuit board 610, spaced apart from the antenna array. The RFIC 652 may process a signal of a selected frequency band, which is transmitted/received through the antenna array 630. According to an embodiment, the RFIC 652 may convert a baseband signal acquired from a communication processor (not shown) into an RF signal of a designated band when transmitting signals. When receiving signals, the RFIC 652 may convert an RF signal received through the antenna array 630 into a baseband signal, and may transmit the baseband signal to the communication processor.

According to another embodiment, when transmitting signals, the RFIC 652 may up-convert an IF signal (for example, about 9 GHz to about 11 GHz) acquired from an intermedia frequency integrated circuit (IFIC) (for example, the fourth RFIC 228 of FIG. 2) into an RF signal of a selected band. When receiving signals, the RFIC 652 may down-convert an RF signal acquired from the antenna array 630 into an IF signal, and may transmit the IF signal to the IFIC.

The PMIC 654 may be disposed on some other area (for example, the second surface) of the printed circuit board 610, spaced apart from the antenna array. The PMIC 654 may receive power from a main PCB (for example, the printed circuit board 560 of FIG. 5), and may provide necessary power to various components (for example, the RFIC 652) on the antenna module.

The shielding member 620 may be disposed on a portion (for example, the second surface) of the printed circuit board 610 to electromagnetically shield at least one of the RFIC 652 and/or the PMIC 654. In an embodiment, the shielding member 690 may include a shield can and/or an epoxy molding compound, but is not limited thereto.

The first antenna module 431 may electrically connect the connector 550 to another printed circuit board (for example, the printed circuit board 560 of FIG. 5). The connector 550 may include, for example, a coaxial cable connector, a board to board connector, an interposer, or a flexible printed circuit board (FPCB). The RFIC 652 and/or the PMIC 654 of the first antenna module 431 may be electrically connected with another printed circuit board through the connector 550.

According to certain embodiments, an electronic device comprises: a window forming at least a portion of a front surface of the electronic device; a cover forming at least a portion of a rear surface of the electronic device; a bracket disposed between the window and the cover; a printed circuit board supported by the bracket and disposed between the window and the cover; a shield can disposed on the printed circuit board covering a designated area of the printed circuit board; at least one communication processor disposed on the printed circuit board; and a mmWave antenna module connected to the printed circuit board, and electrically connected with the at least one communication processor via the printed circuit board, wherein the mmWave antenna module is disposed on the shield can and configured to transfer heat to the shield can.

According to certain embodiments, the electronic device further comprises at least one electronic circuit component disposed on the designated area of the printed circuit board.

According to certain embodiments, the at least one electronic circuit element comprises a diplexer.

According to certain embodiments, the shield can comprise an opening overlapping the electronic circuit component.

According to certain embodiments, the electronic device further comprises an adhesive member interposed between the mmWave antenna module and the shield can.

According to certain embodiments, the adhesive member comprises a conductive double-sided tape.

According to certain embodiments, the electronic device further comprises solder attaching the shield can to the printed circuit board.

According to certain embodiments, the mmWave antenna module is spaced apart from the cover.

According to certain embodiments, an upper surface of the shield can comprises a first area contacting the mmWave antenna module, and a second area extended from the first area, and the second area of the shield can has a step from the first area.

According to certain embodiments, the mmWave antenna module comprises a connector connected with the printed circuit board, and the connector is extended between the mmWave antenna module and the second area of the shield can.

According to certain embodiments, the shield can comprises copper.

According to certain embodiments, the mmWave antenna module comprises: a substrate comprising a plurality of layers in which a conductive layer and a nonconductive layer are alternately stacked; an array antenna formed on a first conductive layer from among the plurality of layers of the substrate; and an RFIC disposed on a second conductive layer from among the plurality of layers of the substrate.

According to certain embodiments, the mmWave antenna module comprises a shielding layer enclosing the RFIC, and the shielding layer contacts the shield can.

According to certain embodiments, the shielding layer comprises a conductive shielding member or an epoxy molding compound (EMC).

According to certain embodiments, the mmWave antenna module is a first mmWave antenna module, the electronic device further comprises a second mmWave antenna module and a third mmWave antenna module electrically connected with the at least one communication processor, the first mmWave antenna module is disposed to face the cover, and the second mmWave antenna module and the third mmWave antenna module are disposed to face a side surface of the electronic device between the window and the cover.

According to certain embodiments, an electronic device comprises: a front surface plate which is substantially transparent; a rear surface plate which faces the front surface plate; a printed circuit board which is disposed between the front surface plate and the rear surface plate; a plurality of electronic circuit elements disposed on the printed circuit board; a shield can be disposed on the printed circuit board; solder attaching the shield to the printed circuit board and covering the plurality of electronic circuit elements; and a mmWave antenna module disposed on the shield can, wherein the mmWave module comprises: a substrate part formed with a plurality of layers; a shielding part configured to cover a portion of the substrate part, wherein the shielding part contacts the shield can.

According to certain embodiments, the mmWave antenna module is disposed to face the rear surface plate, and is spaced apart from the rear surface plate.

According to certain embodiments, the shield can comprises an opening overlapping at least one electronic circuit element from among the plurality of electronic circuit elements.

According to certain embodiments, an upper surface of the shield can comprise a first area contacting the mmWave antenna module and a second area extended from the first area, the mmWave antenna module comprises a connector connected with the printed circuit board, the connector passes through a space between the mmWave antenna module and the second area, and is extended to the printed circuit board, the shield can comprise a step portion formed on the upper surface of the shield can, and the step portion is formed between the first area and the second area.

According to certain embodiments, a conductive double-sided tape interposed between the shield can and the mmWave antenna module.

The effects achieved in the disclosure are not limited to those mentioned above, and other effects that are not mentioned above may be clearly understood to those skilled in the art based on the description provided above.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the disclosure.

What is claimed is:

1. An electronic device comprising:
a window forming at least a portion of a front surface of the electronic device;
a cover forming at least a portion of a rear surface of the electronic device;
a bracket disposed between the window and the cover;
a printed circuit board supported by the bracket and disposed between the window and the cover;
a shield can disposed on the printed circuit board covering a designated area of the printed circuit board;
at least one communication processor disposed on the printed circuit board; and
a mmWave antenna module connected to the printed circuit board, and electrically connected with the at least one communication processor via the printed circuit board,
wherein the mm Wave antenna module is disposed on a first area of the shield can, the first area of the shield can separate from a second area of the shield can by a step, such that the first area is above the second area, the mm Wave antenna module configured to transfer heat to the shield can, and
wherein the mmWave antenna module is directly exposed to the cover, and includes a connector disposed between the cover and the second area of the shield can.

2. The electronic device of claim 1, further comprising at least one electronic circuit component disposed on the designated area of the printed circuit board.

3. The electronic device of claim 2, wherein the at least one electronic circuit component comprises a diplexer.

4. The electronic device of claim 2, wherein the shield can comprise an opening overlapping the at least one electronic circuit component.

5. The electronic device of claim 1, further comprising an adhesive member interposed between the mm Wave antenna module and the shield can.

6. The electronic device of claim 5, wherein the adhesive member comprises a conductive double-sided tape.

7. The electronic device of claim 1, further comprising solder attaching the shield can to the printed circuit board.

8. The electronic device of claim 1, wherein the mm Wave antenna module is spaced apart from the cover.

9. The electronic device of claim 1, wherein the connector is connected with the printed circuit board, and
wherein the connector is extended between the mm Wave antenna module and the second area of the shield can.

10. The electronic device of claim 1, wherein the shield can comprises copper.

11. The electronic device of claim 1, wherein the mm Wave antenna module comprises:
a substrate comprising a plurality of layers in which a conductive layer and a nonconductive layer are alternately stacked;
an array antenna formed on a first conductive layer from among the plurality of layers of the substrate; and
an RFIC disposed on a second conductive layer from among the plurality of layers of the substrate.

12. The electronic device of claim 11, wherein the mm Wave antenna module comprises a shielding layer enclosing the RFIC, and
wherein the shielding layer contacts the shield can.

13. The electronic device of claim 12, wherein the shielding layer comprises a conductive shielding member or an epoxy molding compound (EMC).

14. The electronic device of claim 1, wherein the mmWave antenna module is a first mm Wave antenna module,
wherein the electronic device further comprises a second mm Wave antenna module and a third mmWave antenna module electrically connected with the at least one communication processor,
wherein the first mm Wave antenna module is disposed to face the cover, and
wherein the second mmWave antenna module and the third mm Wave antenna module are disposed to face a side surface of the electronic device between the window and the cover.

15. The electronic device of claim 1, wherein the shield can is configured to transmit the transferred heat from mm Wave module to the PCB.

16. An electronic device comprising:
a front surface plate which is substantially transparent;
a rear surface plate which faces the front surface plate;
a printed circuit board (PCB) which is disposed between the front surface plate and the rear surface plate;
a plurality of electronic circuit elements disposed on the printed circuit board;
a shield can be disposed on the printed circuit board;
solder attaching the shield can to the printed circuit board and covering the plurality of electronic circuit elements; and
a mm Wave antenna module disposed on a first area of the shield can, the first area of the shield can separate from a second area of the shield can by a step, such that the first area is above the second area,
wherein the mm Wave antenna module comprises:
a substrate part formed with a plurality of layers, the substrate part having a first surface and a second surface opposite of the first surface;
an array antenna disposed on the first surface of the substrate part;
a shielding part disposed on the second surface of the substrate part and covering a portion of the substrate part,
wherein the shielding part contacts the shield can, and
wherein the mmWave antenna module is directly exposed to the rear surface plate, and includes a connector disposed between a cover and the second area of the shield can.

17. The electronic device of claim 16, wherein the mm Wave antenna module is disposed to face the rear surface plate, and is spaced apart from the rear surface plate.

18. The electronic device of claim 16, wherein the shield can comprises an opening overlapping at least one electronic circuit element from among the plurality of electronic circuit elements.

19. The electronic device of claim 16, wherein an upper surface of the shield can comprise a first area contacting the mm Wave antenna module and a second area extended from the first area,
wherein the connector is connected with the printed circuit board,
wherein the connector passes through a space between the mmWave antenna module and the second area, and is extended to the printed circuit board,
wherein the shield can comprise a step portion formed on the upper surface of the shield can, and
wherein the step portion is formed between the first area and the second area.

20. The electronic device of claim 16, comprising a conductive double-sided tape interposed between the shield can and the mm Wave antenna module.

* * * * *